United States Patent
Yahav et al.

(10) Patent No.: US 10,187,625 B2
(45) Date of Patent: Jan. 22, 2019

(54) DEVICES AND METHODS FOR GENERATING A 3D IMAGING DATASET OF AN OBJECT

(71) Applicant: Segoma Ltd., Herzlia (IL)

(72) Inventors: Litan Yahav, Tel-Aviv (IL); Tomer Salvi, Har-Adar (IL); Gilad Kapelushnik, Natania (IL)

(73) Assignee: Segoma Ltd., Herzlia (IL)

( * ) Notice: Subject to any disclaimer, the term of this patent is extended or adjusted under 35 U.S.C. 154(b) by 0 days.

(21) Appl. No.: 15/822,260

(22) Filed: Nov. 27, 2017

(65) Prior Publication Data

US 2018/0077401 A1    Mar. 15, 2018

Related U.S. Application Data

(63) Continuation of application No. 14/647,487, filed as application No. PCT/IL2013/500990 on Dec. 2, 2013, now Pat. No. 9,832,453.
(Continued)

(51) Int. Cl.
*H04N 7/18* (2006.01)
*H04N 9/47* (2006.01)
(Continued)

(52) U.S. Cl.
CPC ......... *H04N 13/211* (2018.05); *F16M 11/045* (2013.01); *F16M 11/046* (2013.01);
(Continued)

(58) Field of Classification Search
CPC .. F16M 11/045; F16M 11/046; F16M 11/048; F16M 11/18; F16M 11/2014;
(Continued)

(56) References Cited

U.S. PATENT DOCUMENTS 7,830,528 B2    11/2010   Koh et al.
2003/0019852 A1   1/2003   Kaplan et al.
(Continued)

FOREIGN PATENT DOCUMENTS

EP    1524864           4/2005
GB    2473210    *      9/2011
(Continued)

OTHER PUBLICATIONS

International Preliminary Report on Patentability dated Jun. 11, 2015 From the International Bureau of WIPO Re. Application No. PCT/IL2013/050990.
(Continued)

*Primary Examiner* — Robert Chevalier

(57) ABSTRACT

A computerized imaging system and method for creating a 3D imaging dataset of an object are disclosed. The computerized imaging system includes an object stage mounted on a system base plate, the object stage is configured to rotate 360 degrees around its axis perpendicular to the base plate plane. The computerized imaging system includes an elongated elevation arm positioned alongside the object stage, wherein the elongated elevation arm having an image sensor, at least one lens, and a mirror mounted thereon, and wherein the optical axis of the image sensor is parallel to the elongated elevation arm elevation axis. The image sensor is used to capture a plurality of images of the object in a plurality of rotation and elevation angles of the object stage and elongated elevation arm.

27 Claims, 13 Drawing Sheets

Related U.S. Application Data

(60) Provisional application No. 61/732,361, filed on Dec. 2, 2012.

(51) Int. Cl.
*H04N 13/211* (2018.01)
*H04N 5/225* (2006.01)
*G03B 15/00* (2006.01)
*G03B 15/06* (2006.01)
*G03B 17/56* (2006.01)
*G03B 35/02* (2006.01)
*F16M 11/04* (2006.01)
*F16M 11/18* (2006.01)
*F16M 11/20* (2006.01)

(52) U.S. Cl.
CPC .......... *F16M 11/048* (2013.01); *F16M 11/18* (2013.01); *F16M 11/2014* (2013.01); *G03B 15/00* (2013.01); *G03B 15/06* (2013.01); *G03B 17/561* (2013.01); *G03B 35/02* (2013.01); *H04N 5/2252* (2013.01); *H04N 5/2256* (2013.01)

(58) Field of Classification Search
CPC ...... G03B 15/06; G03B 15/00; G03B 17/561; G03B 35/02; H04N 13/021; H04N 5/2256; H04N 5/2252
USPC .......................... 386/86, 143, 61, 63, 73, 64
See application file for complete search history.

(56) References Cited

U.S. PATENT DOCUMENTS

| | | |
|---|---|---|
| 2006/0072821 A1 | 4/2006 | Wang |
| 2006/0147188 A1 | 7/2006 | Weng |
| 2007/0211259 A1 | 9/2007 | Jeon et al. |
| 2012/0183284 A1 | 7/2012 | Neith |
| 2015/0319418 A1 | 11/2015 | Yahav et al. |

FOREIGN PATENT DOCUMENTS

| | | |
|---|---|---|
| WO | WO 2014/083568 | 6/2014 |
| WO | WO 2010/103526 | 9/2016 |

OTHER PUBLICATIONS

International Search Report and the Written Opinion dated Mar. 30, 2014 From the International Searching Authority Re. Application No. PCT/IL2013/050990.
Notice of Allowance dated Aug. 16, 2017 From the US Patent and Trademark Office Re. U.S. Appl. No. 14/647,487. (6 pages).
Official Action dated May 11, 2017 From the US Patent and Trademark Office Re. U.S. Appl. No. 14/647,487. (20 pages).
Third-Party Submission Under 37 CFR 1.290 filed on Aug. 29, 2016 From the US Patent and Trademark Office Re. U.S. Appl. No. 14/647,487.
USPTO Communication dated Sep. 29, 2016 Re Third-Party Submission From the US Patent and Trademark Office Re. U.S. Appl. No. 14/647,487.
Wikipedia "Triangulation", Retrieved From Wikipedia, the Free Encyclopedia, 6 P., Oct. 22, 2012.

* cited by examiner

DEVICES AND METHODS FOR GENERATING A 3D IMAGING DATASET OF AN OBJECT

RELATED APPLICATIONS

This application is a continuation of U.S. patent application Ser. No. 14/647,487 filed on May 27, 2015, which is a National Phase of PCT Patent Application No. PCT/IL2013/050990 having International Filing Date of Dec. 2, 2013, which claims the benefit of priority under 35 USC § 119(e) of U.S. Provisional Patent Application No. 61/732,361 filed on Dec. 2, 2012. The contents of the above applications are all incorporated by reference as if fully set forth herein in their entirety.

FIELD AND BACKGROUND OF THE INVENTION

The present invention, in some embodiments thereof, relates to 3D imaging and, more specifically, but not exclusively, to devices and methods for generating a three dimensional (3D) imaging dataset of an object.

A 3D image can be reconstructed from a set of two dimensional (2D) images. It is the reverse process of obtaining 2D images from the 3D object.

The essence of a 2D image is a projection from a 3D object onto a 2D plane, wherein the object depth is lost. The 3D point corresponding to a specific image point is constrained to be on the line of sight. From a single 2D image, it is impossible to determine which point on this line corresponds to a 3D object point. If two or more images are available, then the position of a 3D point can be found as the intersection of two projection rays. This process is referred to as triangulation. The key for this process is the relations between multiple views which convey the information that corresponding sets of points must contain some structure and that this structure is related to the poses and the calibration of the camera image sensor.

Many existing systems for constructing 3D models are built around specialized hardware, such as stereo rigs, resulting in a high cost devices.

Thus, it would be highly advantageous to provide compact, cost effective devices and methods for generating an imaging dataset of objects that will allow reconstruction of fully rotatable 3D image of the objects.

SUMMARY OF THE INVENTION

According to an aspect of some embodiments of the present invention there is provided a computerized imaging system for creating a 3D imaging dataset of an object. The computerized imaging system includes an object stage mounted on a system base plate where the object stage is configured to rotate 360 degrees around its axis perpendicular to the base plate plane. The computerized imaging system includes an elongated elevation arm positioned alongside the object stage, wherein the elongated elevation arm having an image sensor, at least one lens, and a mirror mounted thereon, and wherein the optical axis of the image sensor is parallel to the elongated elevation arm elevation axis. The elongated elevation arm image sensor is used to capture a plurality of images of the object positioned on the object stage in a plurality of rotation and elevation angles of the object stage and elongated elevation arm.

According to a further feature of an embodiment of the present invention, a computerized method for creating a 3D imaging dataset of an object is provided. The computerized method includes providing a computerized imaging system, uploading a pattern of system configuration parameters stored in a storage medium according to the object type and continuously aligning the object center of mass with the object stage shaft axis. The computerized method includes capturing a plurality of images with pre-defined points of view of the object.

According to a further feature of an embodiment of the present invention, continuously aligning the object center of mass with the object stage axis and capturing the plurality of images with pre-defined points of view of the object further includes capturing an initial set of images of the object, calculating the object center of mass using the first set of images, continuously displacing the XY stage position in order to maintain the object center of mass and the object stage shaft axis aligned, adjusting the lens focus and aperture on the object using lens micro-motors, rotating the object stage with a pre-programmed angle step $\Delta\theta$ in order to capture a plurality of images with different points of view of the object, elevating the elongated elevation arm in a plurality of elevation angles with a pre-programmed elevation angle step $\Delta\Phi$ after each full rotation of the object stage is completed and repeating the rotating and the capturing the plurality of images of the object in each the elevation angle.

According to a further feature of an embodiment of the present invention, a computer program product for creating a 3D imaging dataset of an object is provided. The computer program product includes a computer readable storage medium, first program instructions to upload a pattern of system parameters stored in a storage medium, second program instructions to continuously align the object center of mass with the object stage shaft axis by displacing an XY stage relative to a object stage, third program instructions to capture a plurality of images with pre-defined points of view of the object, wherein the first, second and third program instructions are stored on the computer readable storage medium.

Additional features and advantages of the invention will become apparent from the following drawings and description.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
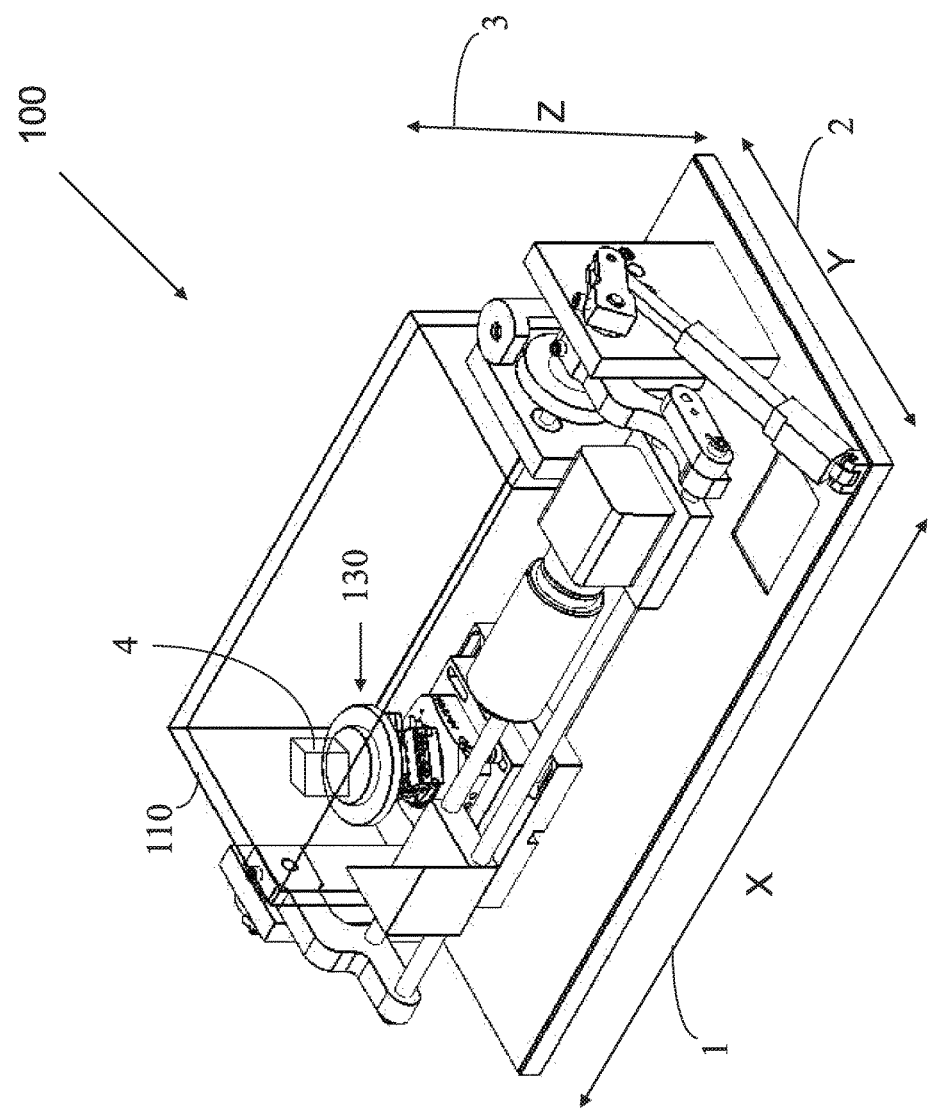
FIG. 1 is a schematic illustration of a computerized imaging system for creating a 3D imaging dataset of an object, according to some embodiments of the present invention.

According to embodiments of the present invention, a computerized imaging system for creating a 3D imaging dataset of an object is provided. The computerized imaging system creates a multi angle fully rotatable 3D image of an object automatically. The computerized imaging system includes an object stage and an elongated elevation arm positioned alongside the stage and having an image sensor, at least one lens and a mirror mounted thereon.

The object stage includes a top plate where the object may be positioned. The top plate may be displaced in the X and Y directions in a plane parallel to the system base plate by an XY stage mounted on a rotary shaft. The rotary shaft is configured to rotate 360 degrees with 0.1 degree accuracy. The XY stage displacements are used to continuously align the calculated object center of mass with the rotary shaft axis. The center of mass of the object may be calculated by image processing of an initial set of 2D images of the object.

The elongated elevation arm positioned alongside the object stage such that the optical axis of the image sensor is parallel to the elongated elevation arm elevation axis. The elongated elevation arm may be elevated in pre-defined elevation angle step, $\Delta\Phi$. The elongated elevation arm mirror is used to reflect the object image along the optical axis to the image sensor. The mirror may be slanted in about 45 degrees in relation to the optical axis; however, other mirror angles may be used and are in the scope of the present application.

According to embodiments of the present invention, patterns of system configuration parameters for creating 3D imaging datasets appropriate to each object type are stored in a storage medium. The pattern of system configuration parameters may include the object type, lighting fixtures configuration, XY stage position, rotation angle step $\Delta\theta$, elevation angle step $\Delta\Phi$, aperture selection, focus selection, shutter selection and combinations thereof.

The computerized imaging system captures a plurality of images of the object in a plurality of rotation and elevation angles of the object stage and elongated elevation arm and reconstructs a fully rotatable 3D image of the object. The fully rotatable 3D image may be displayed and/or transmitted using wired or wireless communication network to users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Reference is now made to FIG. 1, which is a schematic illustration of a computerized imaging system 100 for creating a 3D imaging dataset of an object, according to some embodiments of the present invention. Computerized imaging system 100 is a compact system having typically 30 centimeter (cm) width 1, 40 cm length 2 and 20 cm height 3. Computerized imaging system 100 box cover 110 is a transparent cover made typically from transparent plastic or other polymeric materials and used to cover object stage 130 where an object 4 may be positioned. Object 4 may be a polished diamond or gemstone; however, other objects may be imaged by the present invention computerized imaging system 100. Object stage 130 is configured to be rotated in the base plate plane, XY plane, illustrated in FIG. 1 with a pre-defined angle step $\Delta\theta$ (not shown in the figure) with 0.1 degrees accuracy. The object stage may bear up to a 1 kilogram object.

Figure 2:
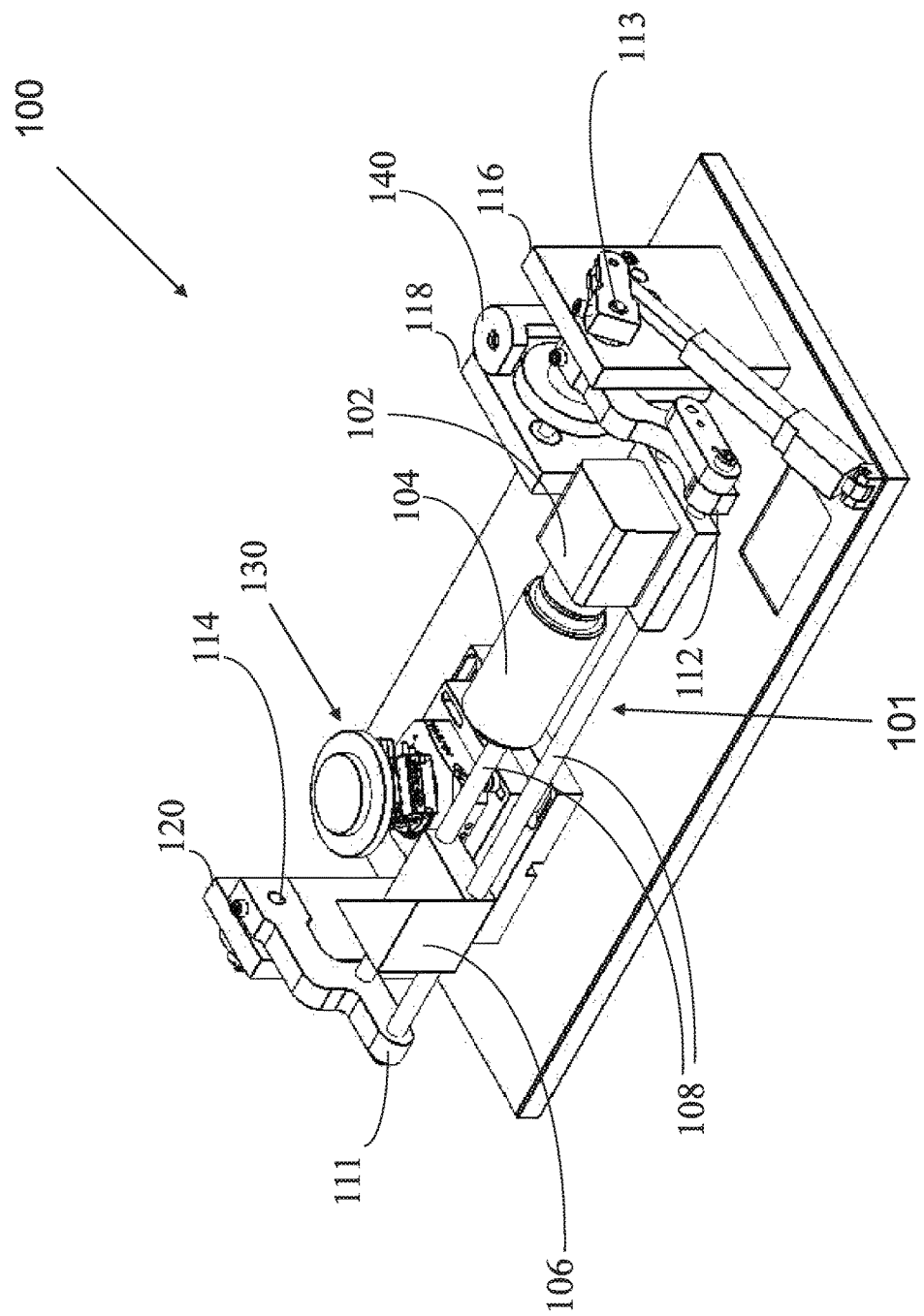
FIG. 2 is a schematic illustration of the main parts of the computerized imaging system for creating a 3D imaging dataset of an object, according to some embodiments of the present invention.
Figure 5:
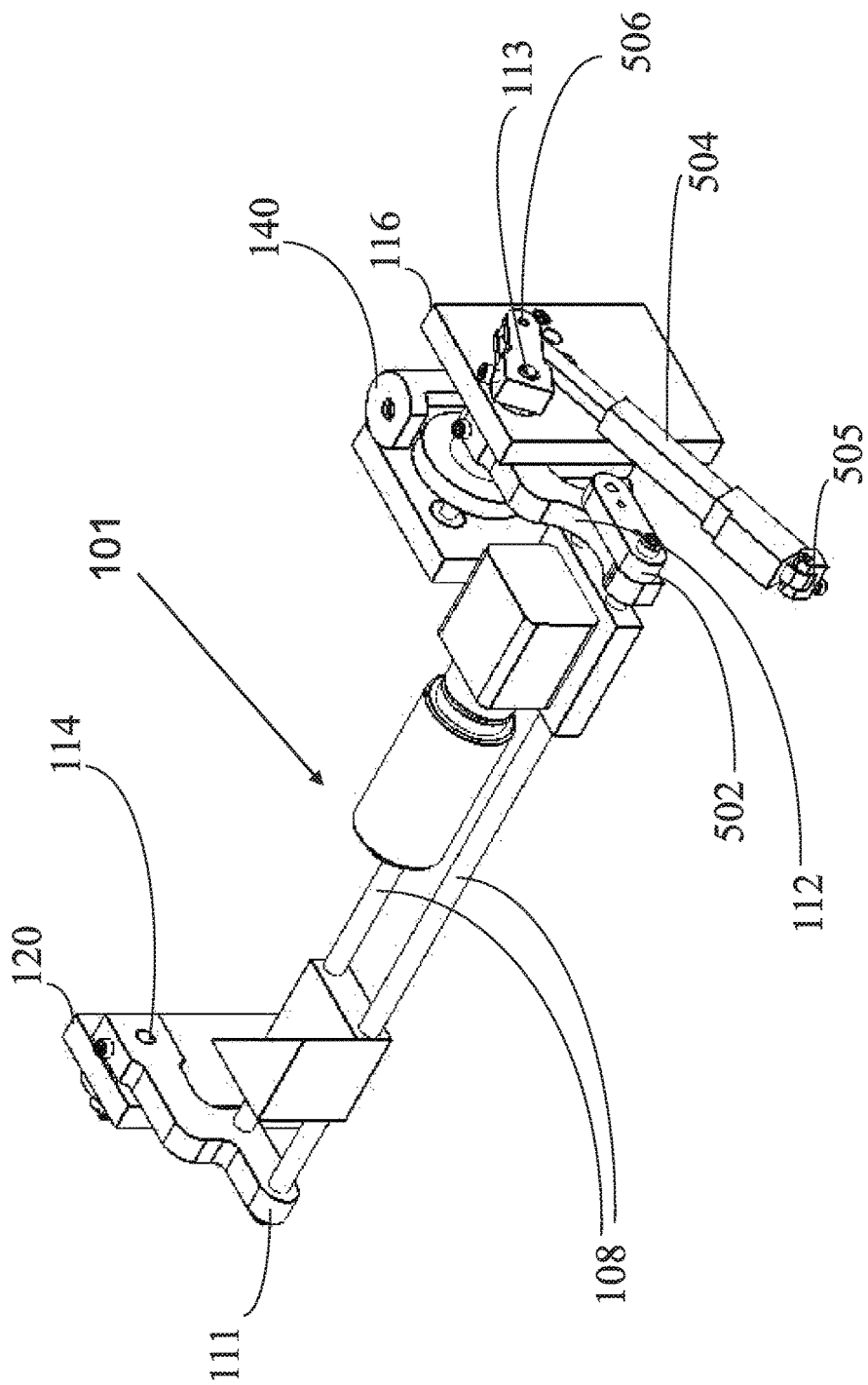
FIG. 5 is a schematic illustration of the elongated elevation arm and the elevation mechanism, according to some embodiments of the present invention.

FIG. 2 is a schematic illustration of the main parts of the computerized imaging system for creating a 3D imaging dataset of an object, according to some embodiments of the present invention. Computerized imaging system 100 includes an elongated movable arm 101 positioned alongside object stage 130. Elongated movable arm 101 supports an image sensor 102, one or more lens(es) 104, a mirror base 106 mounted on two poles 108 held on their two sides by bevels 111 and 112. Elongated elevation arm 101 may be elevated in pre-defined elevation angle step, $\Delta\Phi$ (not shown in the figure) around the elongated arm pivot 113 and 114. The image sensor 102 and lens 104 optical axis is parallel to the elongated elevation arm poles 108 (as shown in FIG. 5, 502) and parallel to the elongated elevation arm elevation axis. Due to the optical axis being directed in parallel to elongated elevation arm 101, the present invention computerized imaging system design 100 is compact having typically 30 cm width, 40 cm length and 20 cm height.

Walls 116, 118 and 120 support the elongated elevation arm 101 elevation mechanism. Step motor 140 is configured to elevate elongated elevation arm 101 by a pre-defined elevation step. The combined rotation of object stage 130 and elongated elevation arm 101 allows the present invention computerized imaging system 100 to reconstruct a 3D fully rotatable image of object 4 with high accuracy and quality from its captured multi angle 2D images.

Figure 3A:
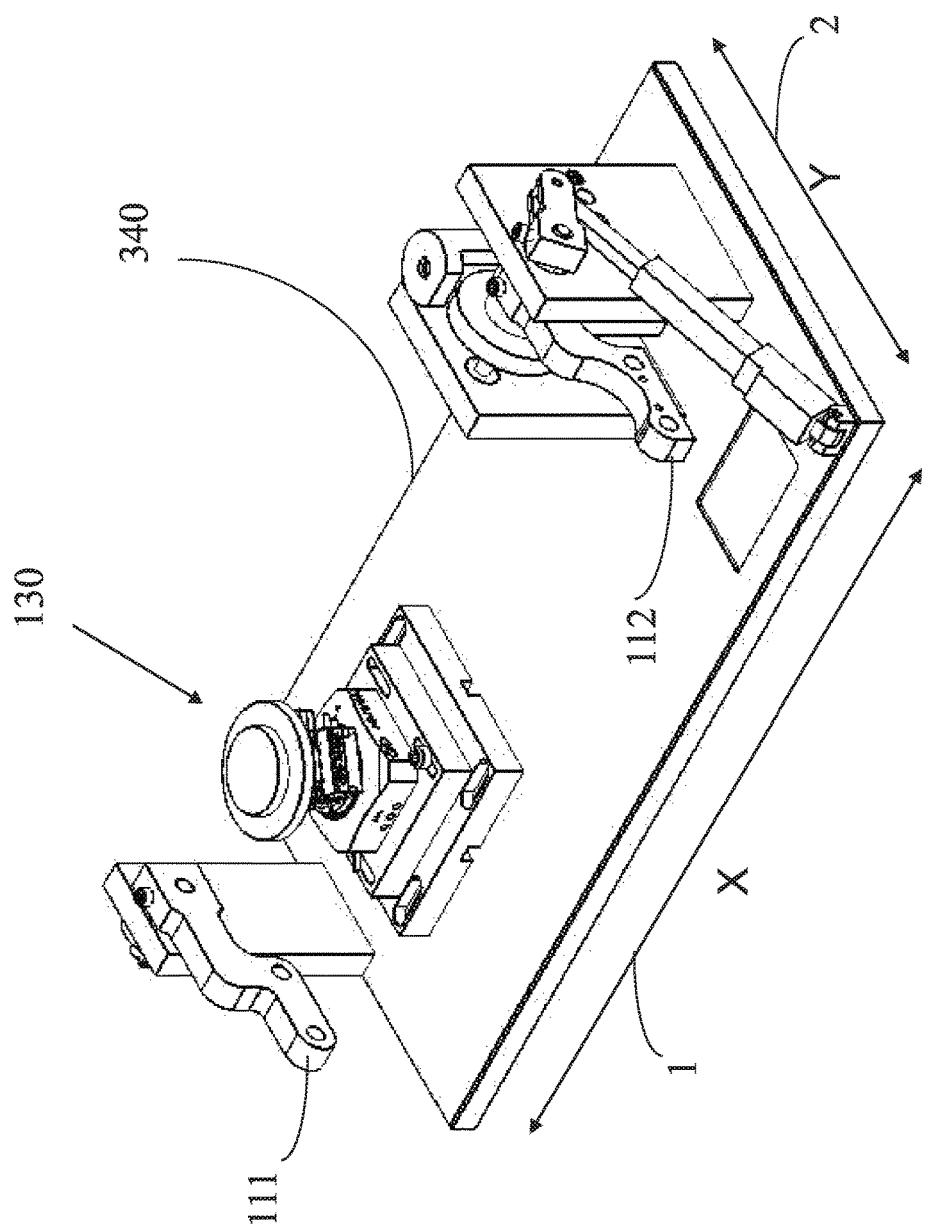
FIGS. 3A-3C are schematic illustrations of the system object stage, according to some embodiments of the present invention.
Figure 3B:
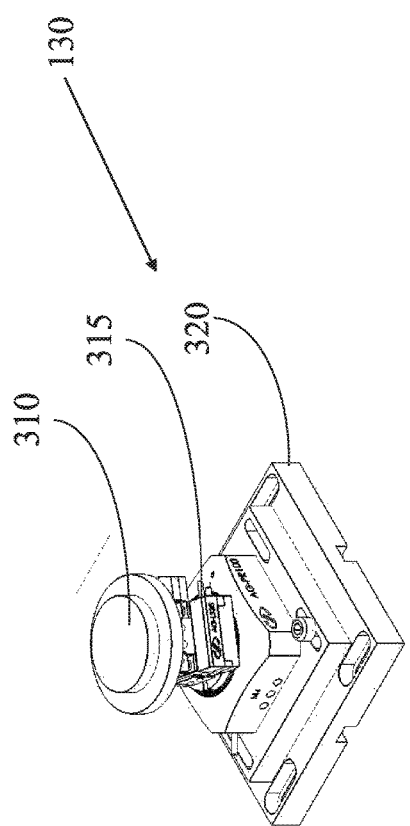
Figure 3C:
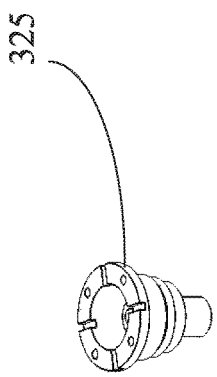

FIG. 3A is a schematic illustration of the system object stage, according to some embodiments of the present invention. Object stage 130 is mounted on the system base plate 340. FIG. 3B is an exploded view of object stage 130. Object stage 130 includes top plate 310, XY stage 315, object stage base 320 and shaft 325 that allows a 360 degrees rotation around the shaft axis 325, shown in FIG. 3C, with a pre-defined angle step $\Delta\theta$.

XY stage 315 allows continuously aligning object 4 center of mass with the shaft axis 325. The XY stage is used to displace the object stage plate 310 in the X and Y directions parallel to the base plate plane 340 with 10 nanometers (nm) accuracy and with total range of 30 millimeters in the X and Y directions.

Computerized imaging system 100 includes a control unit configured to operate elongated elevation arm 101, object stage 130, XY stage 315, image sensor 102 and lens 104. The control unit is further configured to reconstruct a fully rotatable 3D image of object 4 from its captured plurality of 2D images. The control unit may include at least one processor that may be an application-specific integrated circuit (ASIC), a micro-controller, a field-programmable gate array (FPGA) and combinations thereof.

Computerized imaging system 100 may include an array of lighting fixtures (not shown) for illuminating object 4. The lighting fixtures may be high CRI (>95) light emitting diodes (LED) and/or compact fluorescent light (CFL) based light sources, with typically 10 Watts and 5500 Calvin degrees. As used herein, the term CRI means color rendering index.

The lighting fixtures are positioned typically 40 mm from object 4 providing both direct and ambient lighting. Direct lighting may be used initially in order to capture an initial set of images of object 4 in order to calculate the object center of mass. The ambient lighting may be used to provide lighting during capturing the set of images of the object.

Figure 6A:
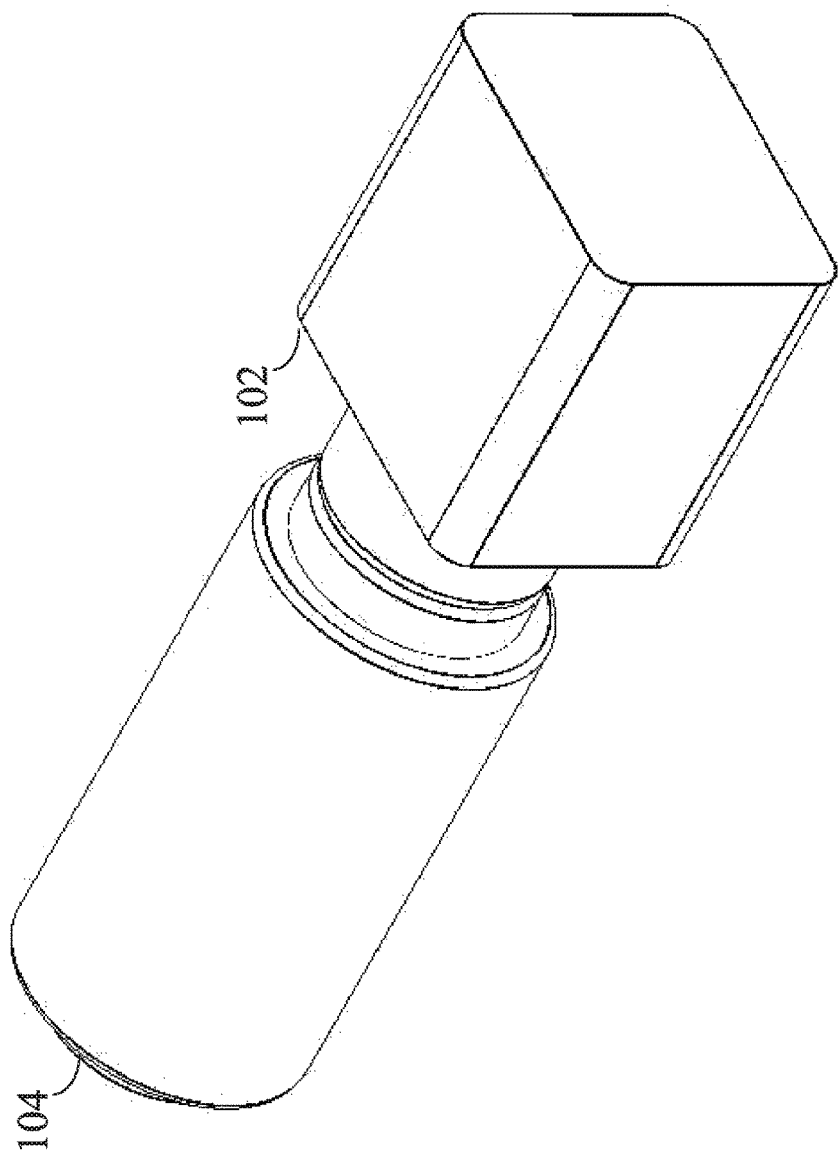
FIG. 6A is a schematic illustration of the image sensor and lens, according to some embodiments of the present invention.
Figure 6B:
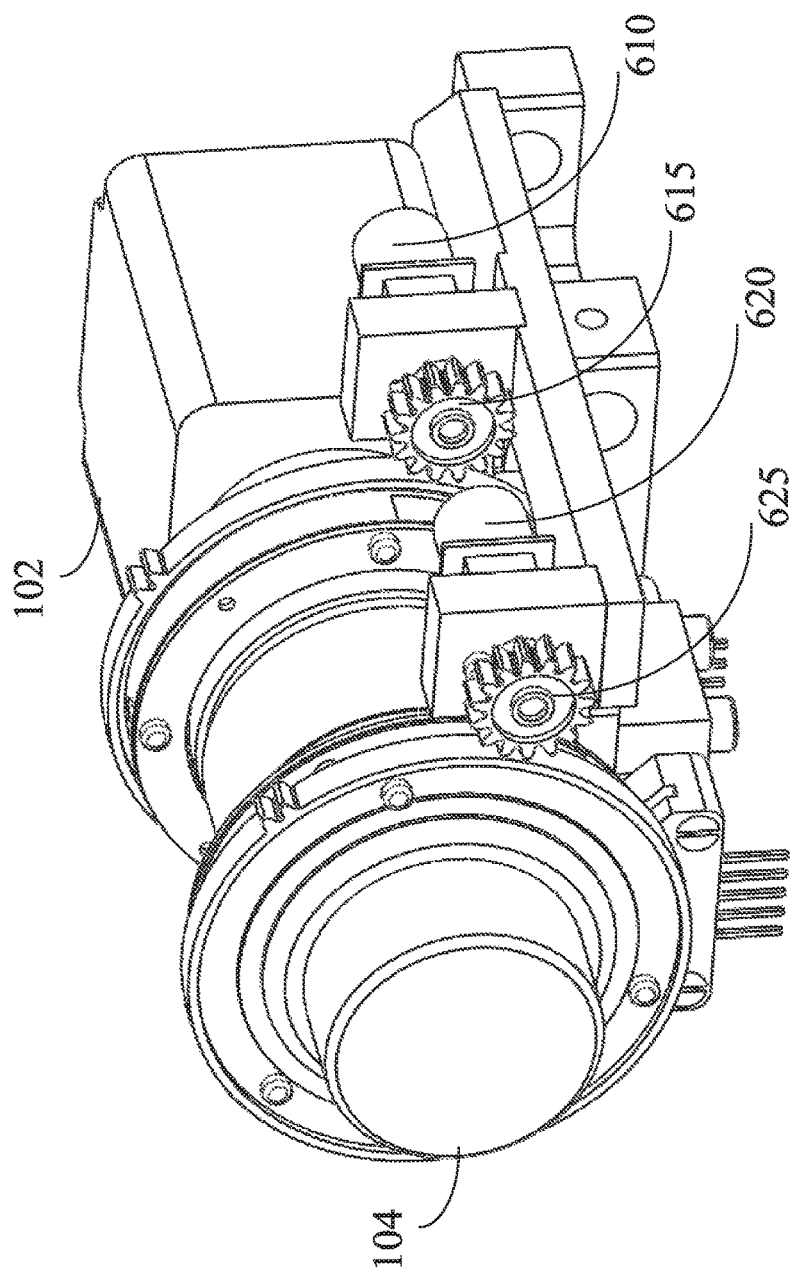
FIG. 6B is a schematic illustration of the lens micromotors, according to some embodiments of the present invention.

Computerized imaging system 100 is configured to continuously displace the XY stage 315 in order to align the calculated center of mass of object 4 with the shaft axis 325 and to adjust the lens focus and aperture on object 4 using lens micro-motors (shown in FIG. 6B).

Optionally, computerized imaging system 100 may include a display used to present the captured 2D images and the fully rotatable 3D image of object 4. Computerized imaging system 100 may further include a wired or wireless internet connection to a server used to transmit the fully rotatable 3D image of object 4 to users. Object 4 may be for example a polished diamond, gemstone, insect, archeological finding or other small-sized product.

Computerized imaging system 100 image sensor and lens may be configured to focus automatically on the polished diamond table facet according to its light reflection initially and/or continuously using the lens micro motors shown further below in FIG. 6B.

Figure 4:
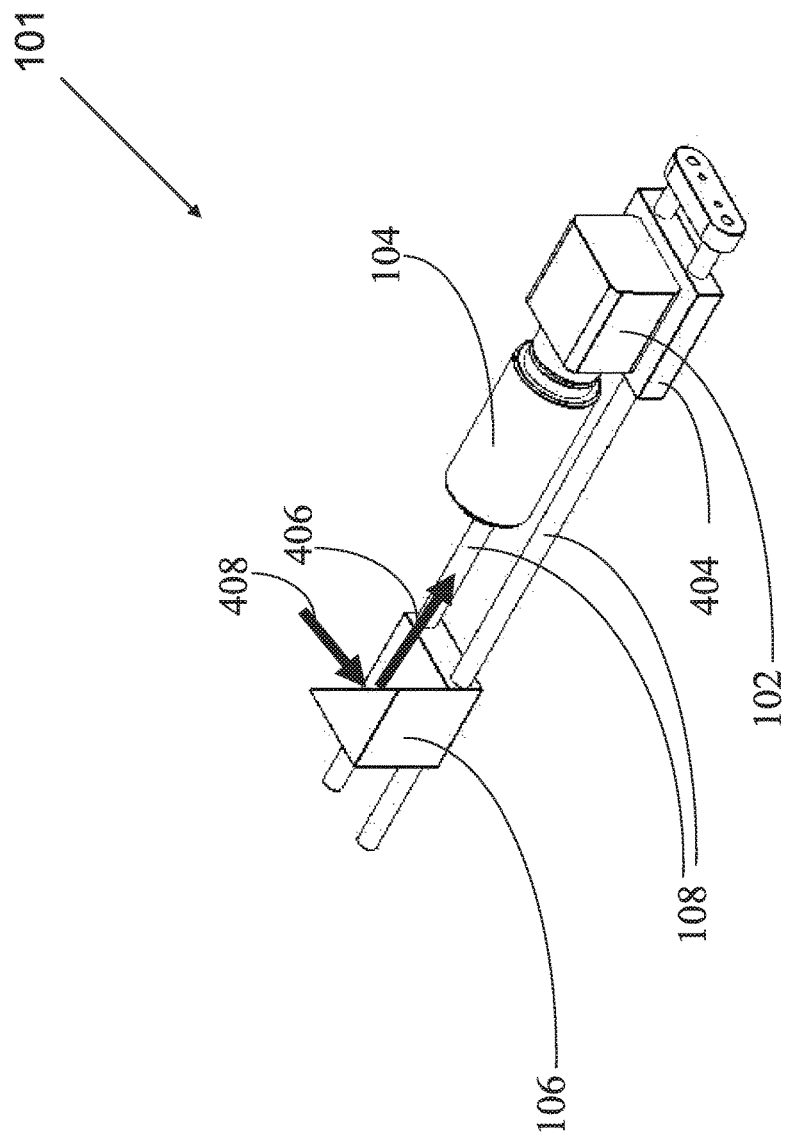
FIG. 4 is a schematic illustration of the elongated elevation arm image sensor, lens and mirror, according to some embodiments of the present invention.

FIG. 4 is a schematic illustration of the elongated elevation arm and the elevation mechanism, according to some embodiments of the present invention. Elongated elevation arm 101 includes camera base 404 and mirror base 106 both having two apertures threaded by the elongated elevation arm poles 108. Camera base 404 is used to mount image sensor 102. Optical axis 406 is directed in parallel to the elongated elevation arm 101. Object 4 image 408 is reflected by a mirror attached to mirror base 106 along optical axis 406 through lens 104 to image sensor 102. Elongated elevation arm 101 mirror may be a 45 degree mirror with high quality 95% transmission in the visual range between 380-700 nm wavelengths. Other mirrors types and mirror angles may be used and are in the scope of the present invention. FIG. 5 is a schematic illustration of the elongated elevation arm image sensor, lens and mirror base, according to some embodiments of the present invention. Elongated elevation arm 101 is connected to side walls 112 and 113 by bevels 111 and 112. End bevel 502 is used to affirm elongated elevation arm 101 poles 108 to bevel 112. Piston 504 distal end 505 is connected to the system base plate 340 and its proximal end is connected to the second bevel 506. Step motor 130 is used to elevate elongated elevation arm 101 around elevation axis 113 and 114 with a pre-defined elevation angle $\Delta\Phi$.

FIG. 6A is a schematic illustration of the image sensor and lens, according to some embodiments of the present invention. Image sensor 102 may be a color camera.

The color camera may be a 1.6 micron, 10 MegaPixels (MP) CCD or CMOS sensor and may include an electronic or mechanical shutter. The typical distance of the camera and lens from the mirror base and the object may be 20 mm. Lens 106 may be 50 mm long lens with 200 lines per mm resolution and less than 0.02% distortion. The lens focus/aperture micro motor may have a 1:1000 transmission ratio. As used herein, the term CCD means a charge-coupled device and the term CMOS means complementary metal-oxide-semiconductor.

FIG. 6B is a schematic illustration of the lens micro-motors, according to some embodiments of the present invention. Micro-motors 610 and 620 are used to control lens 104 focus 615 and aperture 625. The computerized imaging system 100 control system is used to automatically and continuously adjust the image sensor lens 104 focus 625 and aperture 615 in correlation with displacing the XY stage and object stage plate such that object 4 center of mass is positioned at the lens focal point.

Figure 7A:
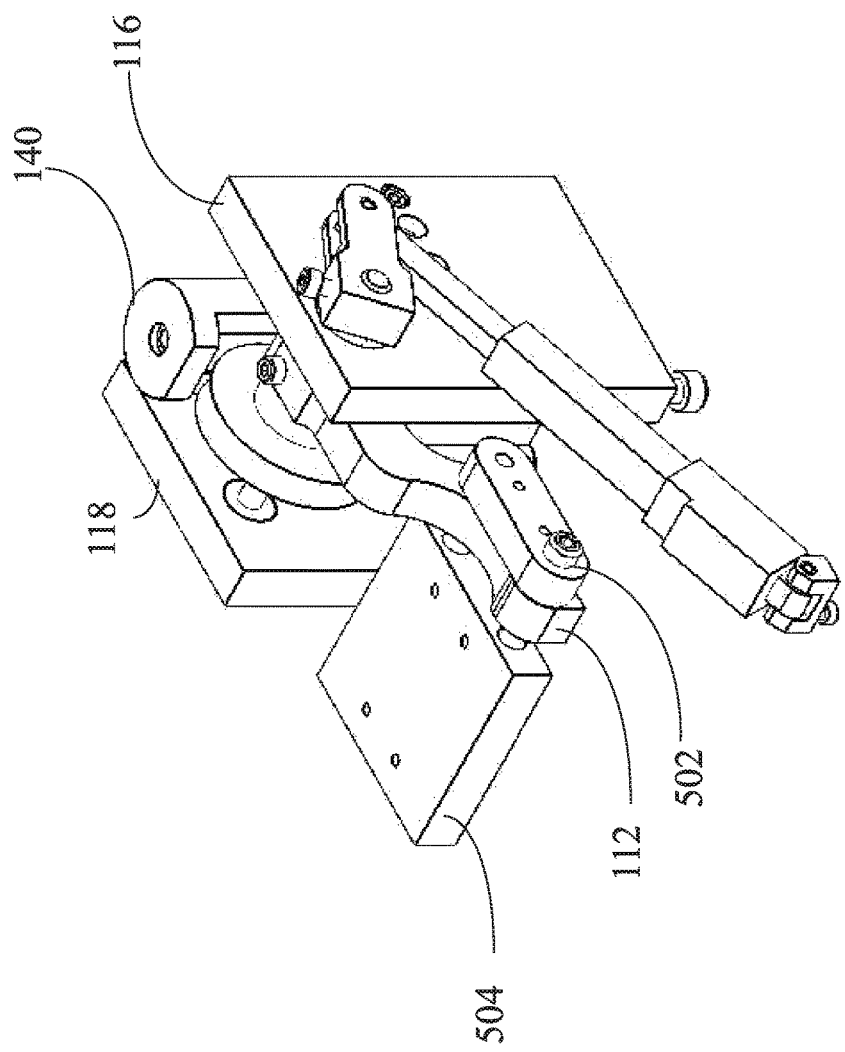
FIGS. 7A-7C are schematic illustrations of the elevation mechanism and the step engine, according to some embodiments of the present invention.
Figure 7B:
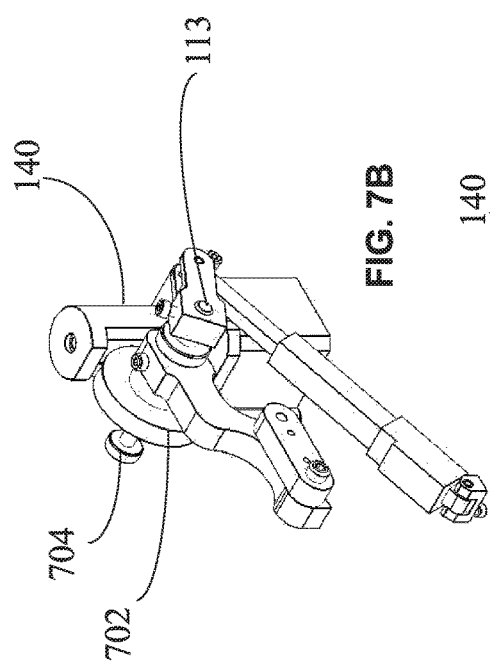
Figure 7C:
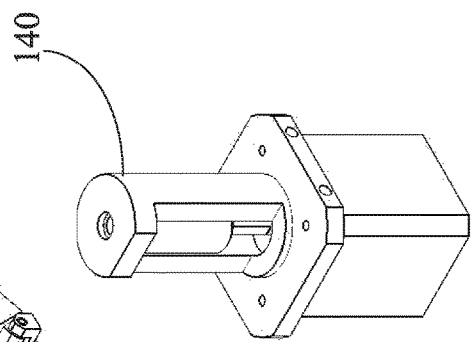

FIGS. 7A-7C are schematic illustrations of the elevation mechanism and the step engine, according to some embodiments of the present invention. Step engine 140 is used to elevate elongated elevation arm 101 by pre-defined elevation angle $\Delta\Phi$. FIG. 7B illustrates the elevation mechanism without side walls 116 and 118.

Gear wheel 702 and shaft 704 are part of elevation axis 113 and 114 shown in FIG. 5. FIG. 7C illustrates step motor 140.

Computerized imaging system 100 may include a storage medium that may be used to store patterns of system configuration parameters appropriate for creating 3D imaging datasets according to the object type. The pattern of system configuration parameters may include the object type, lighting configuration, XY stage position, rotation angle step $\Delta\theta$, elevation angle step $\Delta\Phi$, aperture selection, focus selection, shutter selection and combinations thereof.

Figure 8:
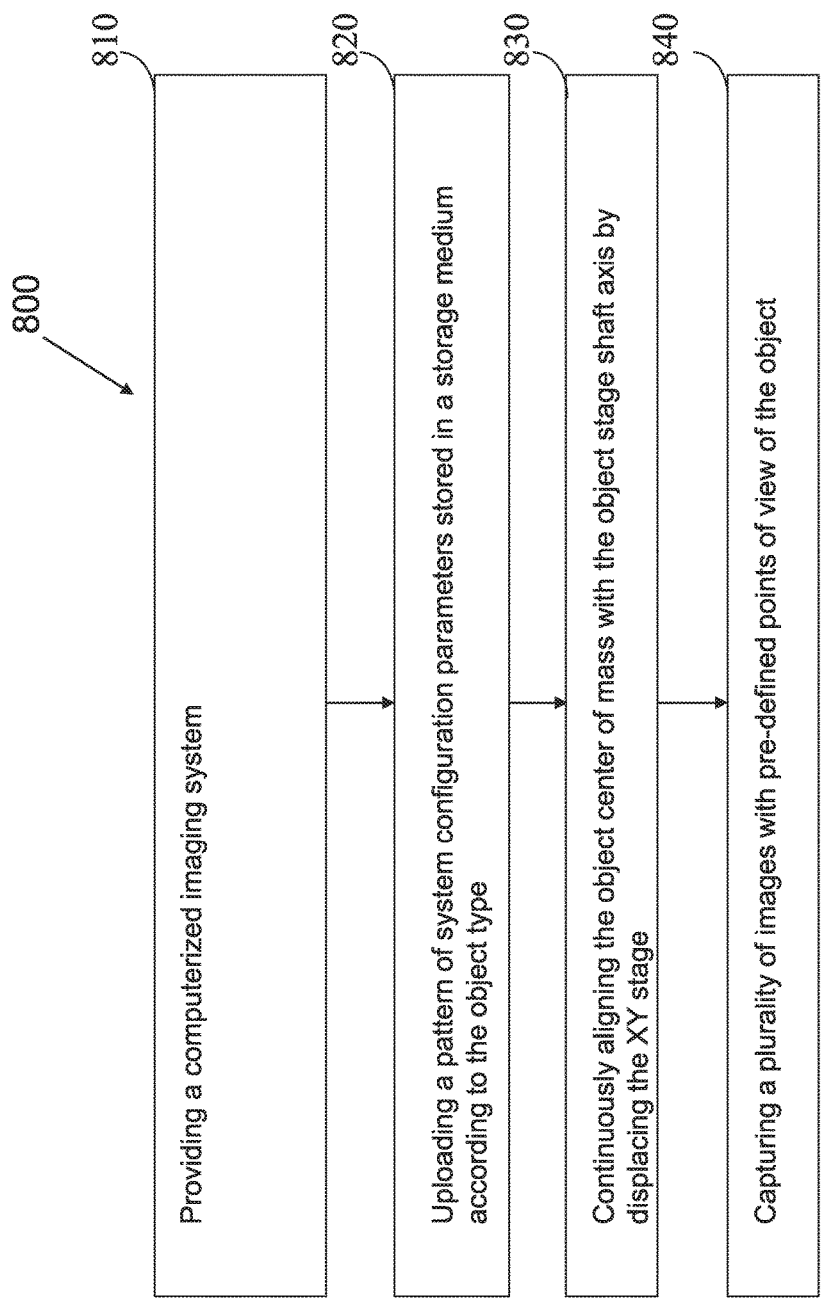
FIG. 8 is a flowchart of a computerized method for creating a 3D imaging dataset of an object, according to some embodiments of the present invention.

FIG. 8 is a flowchart of a computerized method 800 for creating a 3D imaging dataset of an object, according to some embodiments of the present invention. Method 800 includes providing a computerized imaging system that includes an object stage, XY stage and an elongated elevation arm having an image sensor, at least one lens and a mirror mounted thereon, wherein the image sensor optical axis is parallel to the elongated elevation arm elevation axis 810.

Method 800 includes uploading a pattern of system configuration parameters stored in a storage medium according to the object type 820, continuously aligning the object center of mass with the rotary stage axis by displacing an XY stage relative to the object stage 830 and capturing a plurality of images with pre-defined points of view of the object 840.

Figure 9:
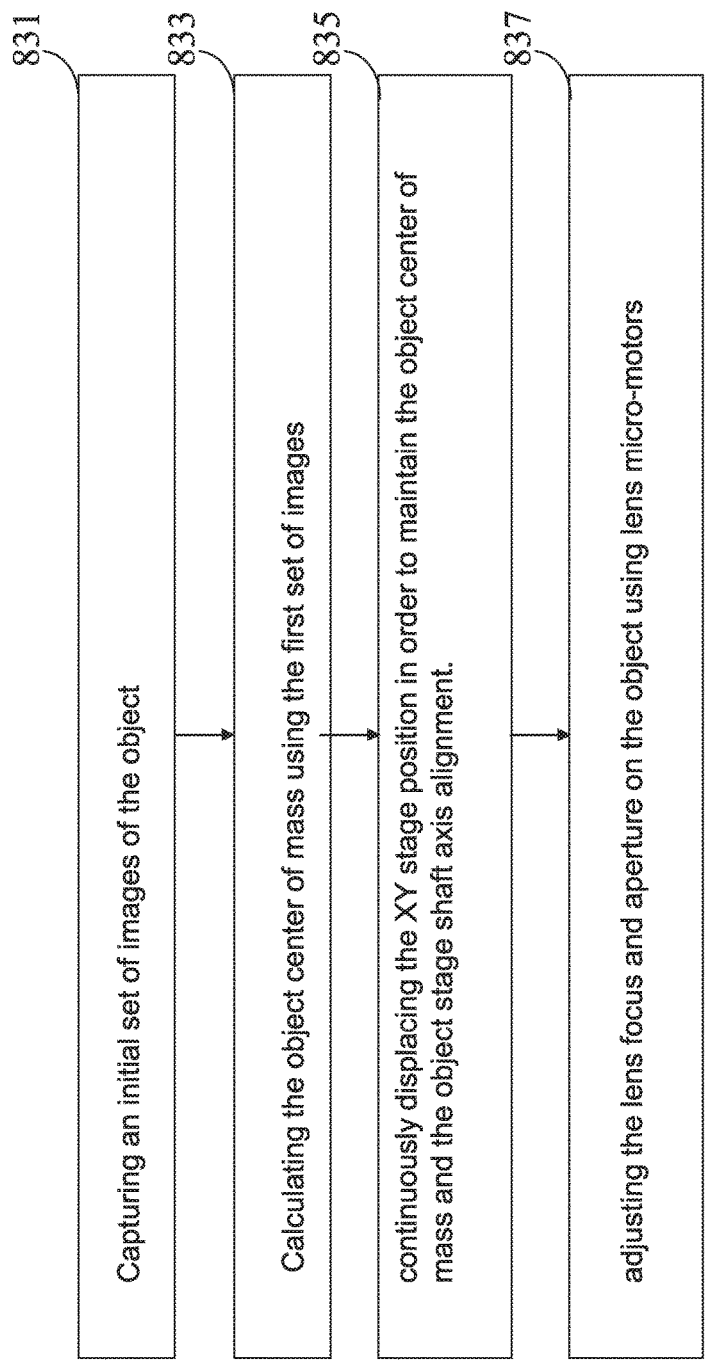
FIG. 9 is a flowchart illustrating the step of continuously aligning the object center of mass with the object stage rotation axis illustrated in FIG. 8, according to some embodiments of the present invention.

FIG. 9 is a flowchart illustrating the step 830 of continuously aligning the object center of mass with the object stage shaft axis illustrated in FIG. 8, according to some embodiments of the present invention. Method step 830 includes capturing an initial set of images of the object 831, calculating the object center of mass using the first set of images 833, continuously displacing the XY stage position in order to maintain the object center of mass and the object stage shaft axis alignment 835, and adjusting the lens focus and aperture on the object using lens micro-motors 837.

Figure 10:
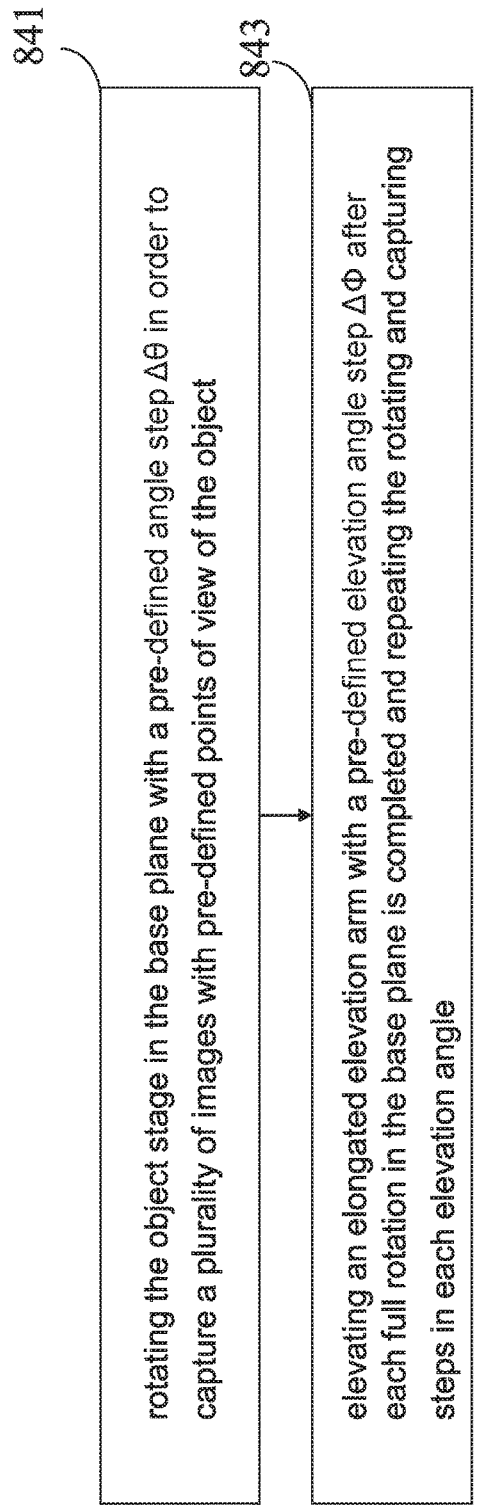
FIG. 10 is a flowchart illustrating the step of capturing a plurality of images with pre-defined points of view of the object illustrated in FIG. 8, according to some embodiments of the present invention.

FIG. 10 is a flowchart illustrating step 840 of capturing a plurality of images with pre-defined points of view of the object illustrated in FIG. 8, according to some embodiments of the present invention. Method step 840 includes rotating the object stage plate in the base plane with a pre-defined angle step $\Delta\theta$ in order to capture a plurality of images with pre-defined points of view of the object 841 and elevating an elongated elevation arm with a pre-defined elevation angle step $\Delta\Phi$ after each full rotation in the base plane is completed and repeating the rotating and capturing steps in each elevation angle 843.

Method 800 includes further reconstructing a 3D fully rotatable image of object 4 from its captured multiple angle 2D images. Method 800 may include further transmitting the fully rotatable image of object 4 to users using a wired or wireless communication network.

Method 800 may include reconstructing and transmitting the mirrored image of object 4. Optionally, method 800 may include transforming the mirrored object image back to the original object orientation by software. Alternatively, a hardware optical component, such as additional lens, may be used to transform the mirrored image of object 4 back to the original object orientation.

According to embodiments of the present invention, a computer program product for creating a 3D imaging dataset of an object is disclosed. The computer program product includes a computer readable storage medium that includes further program instructions to upload a pattern of system configuration parameters stored in a storage medium, to continuously align the object center of mass with the object stage shaft axis by displacing the XY stage relative to the object stage plate and to capture a plurality of images with pre-defined points of view of the object. The program instructions may be stored on the computer readable storage medium.

The program instructions to continuously align the object center of mass with the object stage shaft axis by displacing the XY stage may include program instructions to capture an initial set of images of the object, calculate the object center of mass using the first set of images, to continuously displace the XY stage position in order to maintain the object center of mass and the shaft axis alignment and to adjust the lens focus and aperture on the object using lens micro-motors.

The program instructions to capture a plurality of images with pre-defined points of view of the object may include program instructions to rotate the object stage plate with a pre-programmed angle step $\Delta\theta$ in order to capture a plurality of images with different points of view of the object and to elevate the elongated elevation arm in a plurality of elevation angles with a pre-programmed elevation angle step $\Delta\Phi$ after each full rotation of the object stage plate is completed and repeating the rotating and the capturing a plurality of images of the object in each the elevation angle.

The computer readable storage medium may include program instructions to reconstruct a fully rotatable 3D image of the object from the plurality of captured 2D images, to display the plurality of captured images and the reconstructed 3D fully rotatable image of the object on a display and to transmit the 3D fully rotatable image of the object to users using wired or wireless communication networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for creating a 3D imaging dataset of an object, comprising:
   rotating an object stage having an object stage plate used to support the object about 360 degrees around a first axis;
   rotating at least one pole around a pivot, the pole having an image sensor and a mirror mounted thereon, the pivot being arranged parallel to an optical axis of the image sensor and to a top surface of the object stage plate, wherein rotating the at least one pole about the pivot changes an elevation of the image sensor and the mirror relative to the top surface of the object stage plate;
   displacing the object stage plate in a stage plane perpendicular to the first axis and in parallel to the object stage plate; and
   using the image sensor to capture a plurality of images of the object positioned on the object stage in a plurality of rotation and elevation angles of the object stage and the at least one pole and while the object stage plate is in a plurality of different positions.

2. The method of claim 1, wherein the displacing of the object stage plate is used to align a center of mass of the object with the first axis.

3. The method of claim 1, wherein an XY stage is used to displace the object stage plate by 0 to 30 millimeters in each direction in parallel to the stage plane with at least 10 nanometers accuracy.

4. The method of claim 1, wherein the mirror is used to reflect the object images to the image sensor is a 45 degree mirror.

5. The method of claim 1, further comprising illuminating the object using an array of lighting fixtures.

6. The method of claim 1, further comprising adjusting a lens aperture and a lens focus at a location in front of the image sensor.

7. The method of claim 1, further comprising reconstructing a fully rotatable 3D image of the object from the captured plurality of images.

8. The method of claim 7, further comprising displaying the reconstructed fully rotatable 3D image of the object on a display device.

9. The method of claim 1, further comprising storing system parameter configurations used for creating 3D imaging datasets of a plurality of object types.

10. The method of claim 9, wherein the stored system parameters configurations used for creating 3D imaging datasets of a plurality of object types are selected from the group consisting of: object type, lighting fixtures configuration, XY stage position, rotation angle step $\Delta\theta$, elevation angle step $\Delta\Phi$, aperture selection, focus selection, shutter selection and combinations thereof.

11. The method of claim 1, further comprising uploading a pattern of system configuration parameters stored in a storage medium and creating a 3D imaging dataset of the object according to the uploaded pattern of system configuration parameters.

12. The method of claim 7, wherein the rotation of the at least one pole is controlled using at least one processor selected from the group consisting of: ASICs, micro-controllers, FPGAs and combinations thereof.

13. The method of claim 7, further comprising transmitting the fully rotatable 3D image of the object to users via a wired or wireless connection.

14. The method of claim 1, wherein the object is selected from the group consisting of: polished diamonds, gemstones, insects, archeological findings and small-sized products.

15. The method of claim 14, wherein the object is a polished diamond; wherein the image sensor is configured to focus automatically on a table facet of the polished diamond according to light reflection of the polished diamond table facet.

16. The method of claim 1, further comprising using a XY stage to continuously align a center of mass of the object with the first axis;
   wherein capturing the plurality of images includes capturing the plurality of images with pre-defined points of view of the object; and
   further comprising creating 3D imaging datasets of the object according to a pattern of system configuration parameters selected according to a certain object type.

17. A computerized method of claim 16, wherein the continuously aligning the center of mass of the object with the first axis and capturing the plurality of images with pre-defined points of view of the object further comprise:
   capturing an initial set of images of the object using the image sensor;
   calculating the center of mass of the object using the first set of images;
   adjusting a lens focus and aperture of a lens of the image sensor on the object using lens micro-motors;
   rotating the object stage with a pre-programmed angle step $\Delta\Phi$ in order to capture a plurality of additional images with different points of view of the object; and elevating the at least one pole in a plurality of elevation angles with a pre-programmed elevation angle step ΔΦ after each full rotation of the object stage is completed and repeating the rotating and the capturing the plurality of images of the object in each the elevation angle.

18. A computer program product embodied on a non-transitory computer readable storage medium for creating a 3D imaging dataset of an object, comprising:
a non-transitory computer readable storage medium;
first program instructions to rotate an object stage having an object stage plate used to support the object about 360 degrees around a first axis;
second program instructions to rotate at least one pole around a pivot, the pole having an image sensor and a mirror mounted thereon, the pivot being arranged parallel to an optical axis of the image sensor and to a top surface of the object stage plate, wherein rotating the at least one pole about the pivot changes an elevation of the image sensor and the mirror relative to the top surface of the object stage plate;
third program instructions to displace the object stage plate perpendicular to the first axis and in parallel to the object stage plate; and
fourth program instructions to use the image sensor to capture a plurality of images of the object positioned on the object stage in a plurality of rotation and elevation angles of the object stage and the at least one pole and while the object stage plate is in a plurality of different positions;
wherein the first, second, third and fourth program instructions are stored on the non-transitory computer readable storage medium.

19. The computer program product of claim 18, further comprising fifth program instructions to upload a pattern of system parameters stored in a storage medium, wherein said fifth program instructions are stored on the non-transitory computer readable storage medium.

20. The computer program product of claim 18, further comprising fifth program instructions to continuously align a center of mass of the object with the first axis by displacing an XY stage relative to the object stage, wherein said fifth program instructions are stored on the non-transitory computer readable storage medium.

21. The computer program product of claim 18, further comprising fifth program instructions to capture the plurality of images with pre-defined points of view of the object, wherein said fifth program instructions are stored on the non-transitory computer readable storage medium.

22. A computerized imaging system for creating a 3D imaging dataset of an object, the system comprising:
an object stage rotatable 360 degrees around an first axis and movable in a plane perpendicular to the first axis; and
at least one pole having an elevation axis;
an image sensor mounted to the at least one pole and having an optical axis, the optical axis of the image sensor is arranged parallel to the elevation axis and to a top surface of the object stage;
at least one lens mounted to the at least one pole;
a mirror mounted to the at least one pole;
wherein a rotation of the at least one pole about the elevation axis changes an elevation of the image sensor and the mirror relative to a top surface of the an object positioned on the object stage, the image sensor operable to capture a plurality of images of the object in a plurality of positions of the object stage and the at least one pole.

23. The computerized imaging system of claim 22, wherein the object stage includes an XY stage to move the object stage perpendicular to the first axis.

24. The computerized imaging system of claim 22, wherein the XY stage is movable to align a center of mass of the object with the first axis.

25. The computerized imaging system of claim 24, wherein said XY stage is used to move the object stage by 0 to 30 millimeters in X and Y directions.

26. The method of claim 1, wherein the rotating brings pole from one side of the object to an opposing side of the object while the elevation of the image sensor and the mirror changes.

27. The method of claim 1, wherein the rotating changes the elevation of the pole above the stage plane.

* * * * *

UNITED STATES PATENT AND TRADEMARK OFFICE
CERTIFICATE OF CORRECTION

PATENT NO. : 10,187,625 B2
APPLICATION NO. : 15/822260
DATED : January 22, 2019
INVENTOR(S) : Litan Yahav et al.

Page 1 of 1

It is certified that error appears in the above-identified patent and that said Letters Patent is hereby corrected as shown below:

On the Title Page

Item (63) Related U.S. Application Data, Line 2, "PCT/IL2013/500990" should be changed to -- PCT/IL2013/050990 --

Signed and Sealed this
Seventh Day of May, 2019

Andrei Iancu
*Director of the United States Patent and Trademark Office*